United States Patent
Birke-Salam et al.

(10) Patent No.: US 6,780,545 B2
(45) Date of Patent: Aug. 24, 2004

(54) METHOD FOR MANUFACTURING GALVANIC ELEMENTS HAVING A LIQUID ORGANIC ELECTROLYTE

(75) Inventors: Fatima Birke-Salam, Ellwangen (DE); Peter Birke, Ellwangen (DE); Konrad Holl, Aalen-Dewangen (DE); Heinrich Stelzig, Rosenberg (DE); Dejan Illic, Ellwangen (DE)

(73) Assignee: Varta Microbattery GmbH (DE)

( * ) Notice: Subject to any disclaimer, the term of this patent is extended or adjusted under 35 U.S.C. 154(b) by 36 days.

(21) Appl. No.: 10/308,319

(22) Filed: Dec. 3, 2002

(65) Prior Publication Data

US 2003/0113637 A1 Jun. 19, 2003

(30) Foreign Application Priority Data

Dec. 3, 2001 (DE) .......................................... 101 59 230

(51) Int. Cl.⁷ ............................................... H01M 6/16
(52) U.S. Cl. ...................... 429/326; 429/342; 29/623.3; 29/623.5
(58) Field of Search ................................ 429/326, 342; 29/623.3, 623.5

(56) References Cited

U.S. PATENT DOCUMENTS 5,296,318 A    3/1994   Gozdz et al. ............... 429/192

FOREIGN PATENT DOCUMENTS

WO    WO 00/57504    9/2000

*Primary Examiner*—Hoa Van Le
(74) *Attorney, Agent, or Firm*—Piper Rudnick LLP

(57) ABSTRACT

A method for manufacturing galvanic elements having a liquid organic electrolyte that contain an electrode-separator assembly that has at least one lithium intercalating electrode in whose polymer matrix insoluble, electrochemically active materials are finely distributed in the polymer involved, the electrolyte contains about 2% to about 15% by weight of a hydrocarbon-oxygen compound (carbonate) that has a central carbon atom, to which one oxygen atom is doubly bonded and two oxygen are singly bonded, where the singly bonded oxygen is not saturated by any other atoms or groups and a hydrocarbon chain having a length of four carbon atoms or less is bonded to each of those singly bonded oxygen atoms and these two chains differ by at least one, but no more than three, $CH_2$ groups, and this electrode-separator assembly is initially impregnated with this electrolyte, then cut to size, and subsequently inserted into a housing. The electrode-separator assemblies may be laminated onto conductors and/or counterelectrodes prior to their being impregnated with the electrolyte and may also be rolled up and then impregnated.

15 Claims, No Drawings

METHOD FOR MANUFACTURING GALVANIC ELEMENTS HAVING A LIQUID ORGANIC ELECTROLYTE

RELATED APPLICATION

This application claims priority of German Patent Application No. 101 59 230.2, filed Dec. 3, 2001.

FIELD OF THE INVENTION

This invention relates to a method for manufacturing galvanic elements having a liquid organic electrolyte that contain an electrode-separator assembly that has at least one lithium intercalating electrode in whose polymer matrix insoluble, electrochemically active materials are finely distributed in the polymer involved and galvanic elements manufactured according to the method to be described.

BACKGROUND

In general, electrodes are initially inserted into battery housings, as so-called "half-shells", and then electrolyte is added. However, in cases where extremely flat energy-storage devices having thicknesses of less than 0.5 mm for use on, for example, "smart cards", are involved, that sort of procedure is no longer applicable, since contamination may readily occur in the vicinity of the seal on their cup and cover plate. This is because, in the case of such thin cells, there are no depressions in their housings that the electrolyte may seep back into, which precludes employment of electrolyte-soaked pastes.

In the case of a 3-Volt primary system employing lithium metal and a $MnO_2$-based cathode, the electrolyte is usually either lithium perchlorate, $LiClO_4$, or lithium trifluoromethane sulfonate, $CF_3SO_3Li$, dissolved in propylene carbonate (PC), where a viscosity-reducer, such as dimethoxyethane, is added, if necessary. For example, WO 00/57504 discloses a thin-film cell whose positive electrode is manufactured from a paste-mixture of $MnO_2$, carbon, and electrolyte, where the paste involved is prepared in a frame. In the case of a rechargeable 4-Volt system having a carbon anode and a $LiMeO_2$-cathode (Me=Ni, Co, or Mn), lithium hexafluorophosphate, $LiPo_4F_6$, in admixtures composed of ethylene carbonate (EC), propylene carbonate (PC), dimethyl carbonate (DMC), ethylmethyl carbonate (EMC), diethyl carbonate (DEC), or carbonates derived therefrom, are employed. Employment of polymer electrodes consisting of a film fabricated from a copolymer of polyvinylidene difluoride-hexafluoropropylene and similar admixtures is disclosed in U.S. Pat. No. 5,296,318.

It would therefore be advantageous to provide a method for manufacturing galvanic elements having a liquid organic electrolyte for which, in particular, contamination of housing components with electrolyte is prevented and their housing half-shells may be sealed and protected against leakage.

SUMMARY OF THE INVENTION

This invention relates to a method for manufacturing galvanic elements including a liquid organic electrolyte and an electrode-separator assembly that has at least one lithium intercalating electrode with a polymer matrix in which insoluble, electrochemically active materials are finely distributed, wherein the electrolyte contains about 2% to about 15% by weight of a hydrocarbon-oxygen compound that has a central carbon atom to which one oxygen atom is doubly bonded and two oxygen atoms are singly bonded, wherein the singly bonded oxygen is not saturated by other atoms or groups and a hydrocarbon chain having a length of four carbon atoms or less is bonded to each of the singly bonded oxygen atoms and the two chains differ by at least one, but no more than three, $CH_2$-groups, including impregnating the electrode-separator assembly with the electrolyte, cutting to a selected size the resulting electrolyte impregnated electrode-separator assembly, and inserting the assembly into a housing.

This invention also relates to a galvanic element including a liquid organic electrolyte containing about 2% to about 15% by weight of a hydrocarbon-oxygen compound that has a central carbon atom, to which one oxygen atom is doubly bonded and two oxygen atoms are singly bonded, wherein the singly bonded oxygen is not saturated by other atoms or groups and a hydrocarbon chain having a length of four carbon atoms or less is bonded to each of the singly bonded oxygen atoms and the two chains differ by at least one, but no more than three, $CH_2$-groups, an electrode-separator assembly that has at least one lithium intercalating electrode with a polymer matrix in which insoluble, electrochemically active materials are finely distributed, and a housing.

DETAILED DESCRIPTION

In the case of the method according to the invention, the electrolyte contains about 2% to about 15% by weight of a hydrocarbon-oxygen compound (carbonate) that has a central carbon atom, to which one oxygen atom is doubly bonded and two oxygen atoms are singly bonded, where the singly bonded oxygen is not saturated by other atoms or groups and a hydrocarbon chain having a length of four carbon atoms or less is bonded to each of those singly bonded oxygen atoms and these two chains differ by at least one, but no more than three, $CH_2$-groups. The electrode-separator assembly is initially impregnated with this electrolyte mixture, then cut to size, and subsequently inserted into a housing.

The organic electrolyte according to the invention, which has acyclic carbonates that lack symmetry axes, is particularly beneficial in terms of its rapid penetration into, and slow evaporation from, the electrode-separator assembly, since this particular electrolyte thus contains asymmetric, polar solvents, that reduce surface tension and, thus, allow a uniform, rapid penetration of electrolyte into the cell assembly. Moreover, the vapor pressure of the electrolyte that builds up due to van der Waals forces between the electrolyte and the electrode-separator assembly due to the polar nature of at least one constituent of the electrolyte-solvent mixture is reduced within the cell.

It is beneficial when the electrode-separator assembly is laminated onto a conductor or counterelectrode prior to its being impregnated with a liquid organic electrolyte, where the electrode-separator assembly may also be rolled up and then impregnated.

The carbonate involved is ethylmethyl carbonate or propylmethyl carbonate in an electrolyte mixture that preferably contains lithium perchlorate, propyl carbonate, and ethylmethyl carbonate. Other electrically conductive salts include lithium-bis(oxalato)borate and lithium trifluorotri(pentafluoroethyl)phosphate. Both are preferred because they, like lithium perchlorate, liberate no hydrochloric acid as prospective hydrolysis products when they come into contact with water. Propylene carbonate (PC) and ethylene carbonate (EC) are other possible electrolyte constituents.

It is particularly beneficial when the method according to the invention is employed for manufacturing flat cells that are less than about 0.5 mm thick and have rated capacities of less than about 50 mAh.

Polyvinylidene fluorides (PVDF) and hexafluoropropylene (HFP) represent suitable choices of polymers for fabricating electrode-separator assemblies according to the invention. Solvents that may be employed are, for example, n-methyl pyrrolidine-2-pyrrolidone, acetone and the like. The porous separator material comprises polyolefins, preferably polypropylene or polyethylene, or multilayer laminates fabricated from various combinations of these materials.

Materials suitable for fabricating negative electrodes include metallic lithium or graphitized carbon and, if necessary, modified carbon, preferably containing about 65% to about 85% of the stated classes of materials by weight, as well as intercalation compounds of mixed oxides having suitable voltage levels, while positive electrodes may contain an iron-oxygen or manganese-oxygen compound that may also contain phosphorus or lithium, if necessary, as their intercalated lithium material.

The paste mixtures employed for fabricating negative-electrode foils contain about 55% to about 95%, preferably about 65% to about 85%, of the aforementioned classes of materials by weight. The paste mixtures employed for fabricating positive electrodes contain about 65% to about 98%, preferably about 65% to about 95%, of the positive-electrode material(s) by weight. Paste mixtures according to the invention contain about 50% to about 75%, preferably about 55% to about 65%, solvent by weight. The PVDF/HFP-ratios of positive-electrode foils range from a maximum of about 99.5 to a minimum of about 0.5, and preferably range from a maximum of about 80 to a minimum of about 20. Their PVDF/HFP molecular-weight ratios range from about 3.2 to about 2.8, or preferably range from about 2.3 to about 2.5.

The PVDF/HFP-ratios of negative-electrode foils range from about 99.5 to about 0.5, and preferably range from about 85 to about 15. The PVDF/HFP molecular-weight ratios range from about 3.2 to about 2.8, or preferably range from about 2.3 to about 2.5.

The pastes involved are manufactured such that the viscosities of the initial mixtures range from about 1 Pascal·sec (Pa·S) to about 10 Pascals·sec, and preferably range from about 3 Pascals·sec to about 6 Pascals·sec.

To manufacture galvanic elements, the electrodes are either initially spread directly onto conductors or separators or applied to carrier foils and subsequently hot-laminated in a two-stage process. The remainder of cell assembly involves hot-laminating the electrode-separator assemblies onto conductors or hot-laminating the electrode-conductor assemblies onto separators.

EXAMPLE

A pasty material (paste) was prepared by thoroughly mixing 77% by weight braunite (electrolytic MnO2) that had been thermally activated at 360° C., 6% by weight graphite (Timrex KS 6), 2% by weight electrically conductive carbon black (Erachem Super P), 7% by weight polyvinylidene fluoride-hexafluoropropylene (Elf Atochem Kynar Flex 2801), and 8% by weight propylene carbonate (Merck) in acetone. The resultant paste was spread onto a polyolefin (Calgard 2500 polypropylene) separator. The solvent evaporated and the resultant strip was vacuum dried at 110° C. for 48 h and impregnated with an organolithium electrolyte having the composition 0.96 M $LiClO_4$ in 87% propylene carbonate: 13% ethylene carbonate by volume. The electrode-separator assembly was punched out into blanks measuring 1.6 cm×2.3 cm that were inserted into copper-foil housings whose cover sides previously had lithium pressed onto them and whose cup sides had been coated with a graphite-based electrical-conductivity enhancer. The cup and cover plate were ultrasonically welded, using an insulating film wherever copper contacted copper.

Example for Comparison Purposes

Instead of ethylmethyl carbonate, dimethyl carbonate and diethyl carbonate were added to the electrolyte of the above example. Longer penetration times, incomplete penetration, and rapid evaporation were observed in both cases, which was indicated by blackening of the originally white strip and its reversion to a white coloration.

What is claimed is:

1. A galvanic element comprising:
   a liquid organic electrolyte containing about 2% to about 15% by weight of a hydrocarbon-oxygen compound that has a central carbon atom, to which one oxygen atom is doubly bonded and two oxygen atoms are singly bonded, wherein the singly bonded oxygen is not saturated by other atoms or groups and a hydrocarbon chain having a length of four carbon atoms or less is bonded to each of the singly bonded oxygen atoms and the two chains differ by at least one, but no more than three, $CH_2$-groups;
   an electrode-separator assembly that has at least one lithium intercalating electrode with a polymer matrix in which insoluble, electrochemically active materials are finely distributed; and
   a housing.

2. The galvanic element according to claim 1, wherein the electrode-separator assembly is laminated onto a conductor and/or counterelectrode prior to being impregnated with a liquid organic electrolyte.

3. The galvanic element according to claim 1, wherein the electrode-separator assembly is rolled.

4. The galvanic element according to claim 1, wherein the carbonate is ethylmethyl carbonate or propylmethyl carbonate.

5. The galvanic element according to claim 1, wherein the electrolyte contains at least one electrically conducting salt selected from the group consisting of lithium perchlorate, lithium bis(oxalato)borate, and lithium trifluorotri(pentafluoroethyl)phosphate, and at least one of cyclic carbonates propylene carbonate or ethylene carbonate.

6. A galvanic element according to claim 5, wherein the electrolyte contains ethylmethylcarbonate.

7. The galvanic element according to claim 1, wherein the thickness of the galvanic element is less than about 0.5 mm and the cell capacity is less than about 50 mAh.

8. A method for manufacturing galvanic elements comprising a liquid organic electrolyte and an electrode-separator assembly that has at least one lithium intercalating electrode with a polymer matrix in which insoluble, electrochemically active materials are finely distributed, wherein the electrolyte contains about 2% to about 15% by weight of a hydrocarbon-oxygen compound that has a central carbon atom to which one oxygen atom is doubly bonded and two oxygen atoms are singly bonded, wherein the singly bonded oxygen is not saturated by other atoms or groups and a hydrocarbon chain having a length of four carbon atoms or less is bonded to each of the singly bonded oxygen atoms and the two chains differ by at least one, but no more than three, $CH_2$-groups, comprising:

impregnating the electrode-separator assembly with the electrolyte, cutting to a selected size the resulting electrolyte impregnated electrode-separator assembly, and inserting the assembly into a housing.

9. The method according to claim 8, wherein the electrode-separator assembly is laminated onto a conductor and/or counterelectrode prior to being impregnated with a liquid organic electrolyte.

10. The method according to claim 8, wherein the electrode-separator assembly is rolled up and then impregnated.

11. The method according to claim 8, wherein the carbonate is ethylmethyl carbonate or propylmethyl carbonate.

12. The method according to claim 8, wherein the electrolyte contains at least one electrically conducting salt selected from the group consisting of lithium perchlorate, lithium bis(oxalato)borate, and lithium trifluorotri(pentafluoroethyl)phosphate, and at least one of cyclic carbonates propylene carbonate or ethylene carbonate.

13. The method according to claim 12, wherein the electrolyte contains ethylmethylcarbonate.

14. A galvanic element formed according to the method of claim 8.

15. The galvanic element according to claim 14, wherein the thickness of the galvanic element is less than about 0.5 mm and the cell capacity is less than about 50 mAh.

* * * * *